May 13, 1952   R. D. MOORE   2,596,783
ELECTRIC MOTOR FOR FANS

Filed March 24, 1947   3 Sheets-Sheet 1

Inventor
Robert D. Moore
By Fishburn & Mullendore
Attorneys

May 13, 1952  R. D. MOORE  2,596,783
ELECTRIC MOTOR FOR FANS
Filed March 24, 1947  3 Sheets-Sheet 2

Inventor
Robert D. Moore.
By Fishburn & Mullendore
Attorneys

May 13, 1952  R. D. MOORE  2,596,783
ELECTRIC MOTOR FOR FANS
Filed March 24, 1947  3 Sheets-Sheet 3

Inventor
Robert D. Moore,
By
Fishburn & Mullendore
Attorneys.

Patented May 13, 1952

2,596,783

UNITED STATES PATENT OFFICE 2,596,783

ELECTRIC MOTOR FOR FANS

Robert D. Moore, Kansas City, Mo., assignor to The Moore Company, Kansas City, Mo., a corporation of Missouri Application March 24, 1947, Serial No. 736,879

5 Claims. (Cl. 172—36)

This invention relates to pressure blowers or fans of the direct drive, axial flow type and has for its principal object to provide a fan or blower of this character which is of simple, light-weight construction and efficient in operation.

Other objects of the invention are to provide a structure that is substantially free from vibration and operating noises; to provide a construction which permits use of light-weight corrosion and wear resistant materials; to provide a fan and motor unit wherein the motor is completely enclosed within the fan hub and motor supporting housing; to provide for adequate cooling of the motor elements without direct contact by the fluid medium moved by the fan; to provide a simple and efficient seal between the fan hub and stationary housing for excluding the air or gases that are moved by the fan; and to provide a resilient mounting of the motor within the supporting housing.

It is also an object of the invention to provide ring-type supports for connecting the fan to the duct or way in which it is adapted to be installed.

In accomplishing these and other objects of the invention hereinafter pointed out, I have provided improved structure, the preferred form of which is illustrated in the accompanying drawings wherein.

Figure 1:
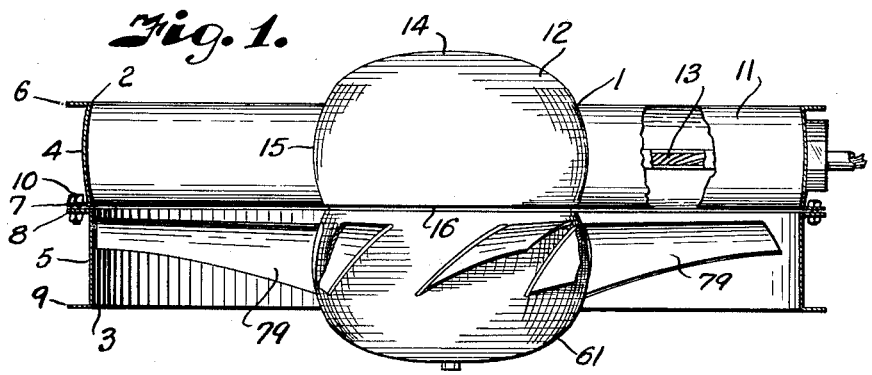
Fig. 1 is a view of a fan assembly embodying the features of the present invention, the supporting rings being shown in section.
Figure 2:
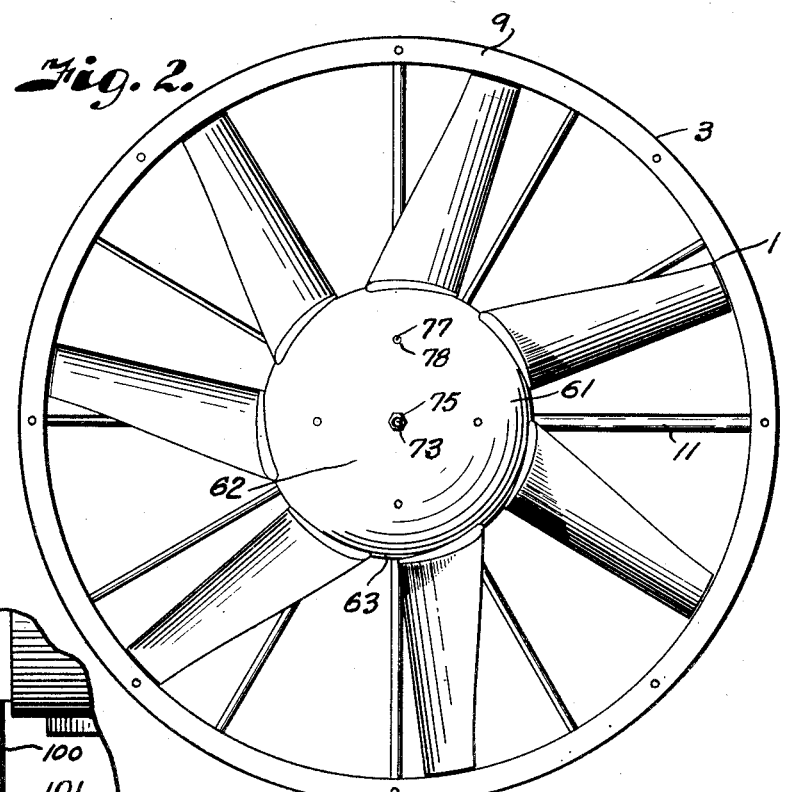
Fig. 2 is a front view of the fan assembly.

Referring more in detail to the drawings:

1 designates a direct drive axial flow pressure fan or blower constructed in accordance with the present invention and which includes a pair of rings 2 and 3 having annular webs 4 and 5 that preferably conform with the diameter of the opening or duct in which the unit may be installed. The rings also include circumferential flanges 6—7 and 8—9, the flanges 7 and 8 being connected together by suitable fastening means such as spot welds, rivets or bolts 10. The other flanges 6 and 9 may be utilized for connecting the unit to a duct or the like depending upon the particular installation and purpose for which the unit is to be used.

Fixed to the web 4 are a plurality of vanes 11 arranged radially about a central stationary housing 12. The vanes preferably are formed of sheet metal to provide a hollow, air foil cross section to streamline the flow discharged from the fan blades later described. The vanes may constitute ducts for carrying the electrical connections 13 to the motor later described and for providing passageways for the circulation of cooling medium to and from the housing 12. The housing 12 is also formed of sheet material and has a dome-shaped end 14 merging into an annular wall 15 having the cross sectional shape of a belt of a sphere. The vanes are rigidly connected to the wall 15 so as to firmly mount the housing within the supporting ring 2 for carrying the weight of the motor and fan assembly later described. The annular wall opposite the closed end 14 terminates in an inwardly extending annular flange or lip 16 encircling an open side 17. Attached to the flange 16 is a seal supporting ring 18. The ring 18 includes an annular flange 19 welded or otherwise attached to the inwardly extending flange 16 and which carries a laterally extending annular flange 20 that is adapted to seat an annular sealing ring 21 that may be formed of felt or other resilient material resistant to corrosive effects of moisture and chemicals contained in the gaseous mediums on which the blower is adapted to operate.

Attached to the inner face of the annular wall 15 of the housing at spaced points about the periphery thereof are brackets 22 including inwardly extending lugs 23 that are suitably braced from base portions 24 of the brackets by spaced side plates 25. The lugs 23 are provided with internally threaded openings 26 for mounting fastening devices such as threaded studs 27 that extend between the side plates 25 in the direction of the seal supporting ring as best shown in Fig. 3.

Figure 3:
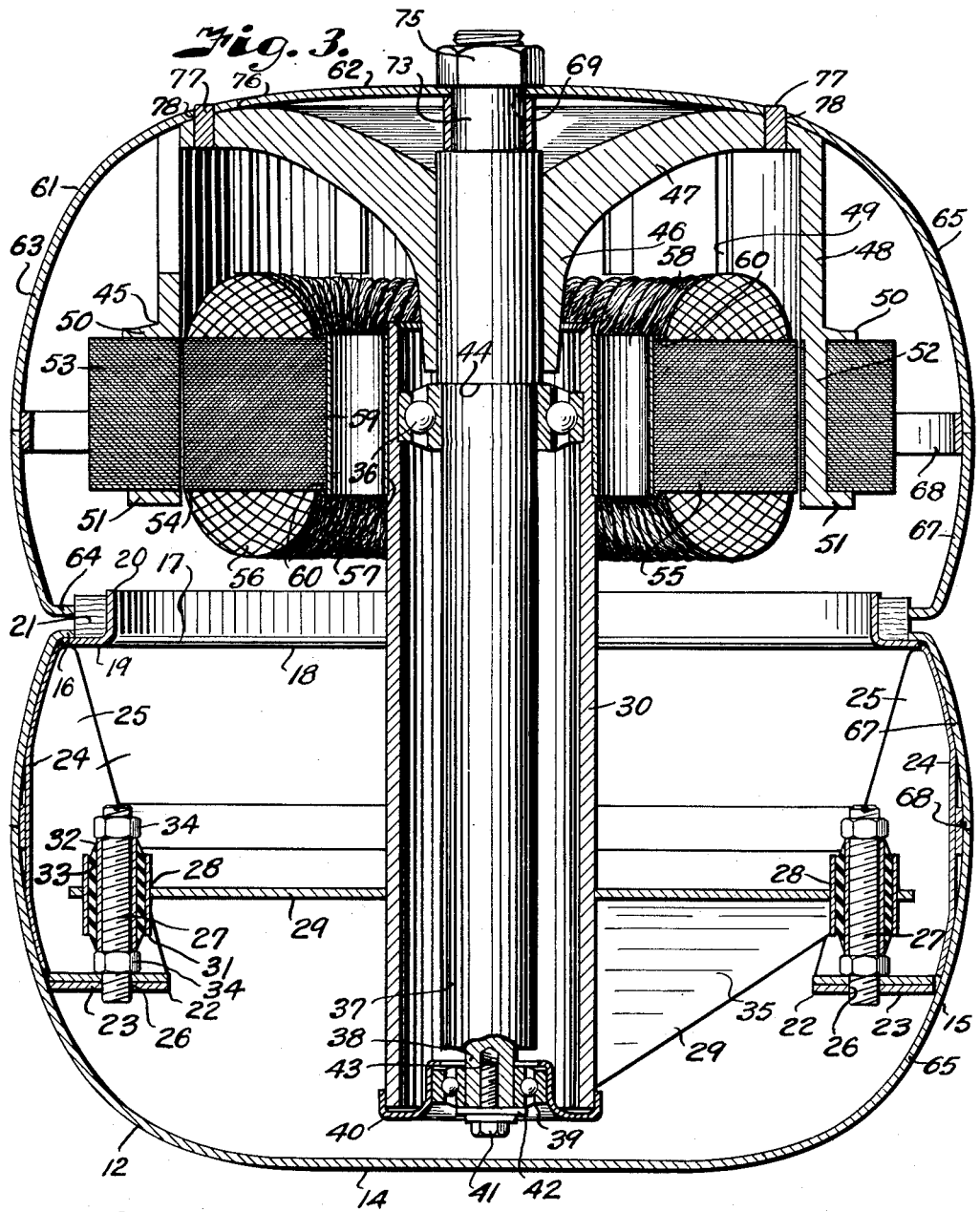
Fig. 3 is an enlarged axial section through the motor, fan hub and supporting housing.

Mounted on the respective studs are resilient shock mounts 28 that are carried by arms 29 extending radially from a motor mounting tube 30 that projects forwardly within the housing and through the open side thereof as shown in Fig. 3. The shock mounts each include outer sleeves 31 and inner sleeves 32 that are connected by a resilient material 33. The outer sleeve of the mounts are fixed to the arms 29 and the inner sleeves are inserted over the stud 27 and secured thereon by nuts 34 that engage the respective ends thereof. The shock mounts thus form resilient connections between the arms 29 and housing 12 and allow limited movement sufficient to absorb vibration and operating noises that would ordinarily be transmitted to the structure or duct in which the blower unit is mounted. The arms 29 are also of light-weight construction and have angle-shaped cross section to provide bracing webs 35. The arms are suitably welded to the tube 30 for forming a rigid light-weight structure.

Journalled coaxially within the tube 30 on a main anti-friction bearing 36 near the forward end thereof is a shaft 37 that has a reduced terminal 38 at the mounted end of the tube to carry an anti-friction bearing 39 that is retained in a cap 40 suitably attached to the end of the tube. The shaft 37 is fixed from axial movement with respect to the tube by a cap screw 41 that extends through a washer 42 which engages against the inner race of the bearing and end of the terminal 38. The cap screw 41 is threaded into an internally threaded socket 43 formed in the terminal 38 of the shaft. The shaft 37 is provided with a shoulder 44 against which the inner race of the main bearing abuts so that when the screw 41 is tightened a fixed axial relationship is maintained between the shaft 37 and its supporting tube 30. The opposite end of the shaft 37 projects from the free end of the supporting tube 30 and mounts the rotary element 45 of the motor now to be described.

The rotary element 45 of the motor includes a hub 46 having a disk-like web 47 carrying an annular series of arms 48 that are spaced apart to provide air circulation openings 49 therebetween. The arms extend retractively over the hub and carry integral flange-like annular rings 50 and 51 spaced apart by a series of bars 52. Mounted on the bars 52 and retained between the flange-like rings 50 and 51 are ring-shaped laminations 53 constituting the armature of the motor. The rotor is preferably cast of a current conducting, non-magnetic metal directly about the laminations so that the flange-like rings and their connecting bars 52 constitute conductors for the induced currents in the armature.

The stationary element 54 of the motor includes a plurality of laminations 55 of disk-like shape and suitably slotted to mount the field windings indicated at 56. The laminations are of suitably exterior diameter so that the peripheries thereof are in substantially close relation with the inner circumference of the lamination rings on the rotor. The stator laminations 55 have axial openings 57 for mounting the stator element directly upon the forward end of the tube 30. In the present illustration, the stator laminations are retained in assembly by tubes 58 that extend through registering openings 59 formed therein and which have the ends flanged outwardly to form retaining flanges 60 as best shown in Fig. 3. The tubes also provide passageway to cooperate with the openings 49 for passing air to carry off the heat generated in the motor as later described. As previously stated the leads to the field winding may be extended into the stator housing 12 and lead through one of the hollow vanes 11 for connection with the current supply and control circuit.

The fan element includes a hub 61 that cooperates with the housing 12 to form an enclosure for the motor and prevent contact of the motor with the gaseous medium to be moved by the fan. The hub is also formed of sheet metal and has substantially the same shape as the stationary housing in that it includes a substantially dome-shaped end wall 62 and an annular wall 63 having the cross sectional shape of the belt of a sphere and which terminates in an inwardly extending flange or lip 64 that encircles the open side of the hub and engages the outer periphery of the sealing ring as shown in Fig. 3.

To facilitate construction of the hub and stationary housing they may be formed of a substantially bell-shaped section 65 and ring section 67 that abut together on the major circumference of the members and which are secured together by a backing ring 68 which is suitably welded or otherwise attached to the lapping edges of the respective sections.

To mount the hub, the closed side thereof has an axial opening 69 to pass a reduced terminal 73 of the shaft 37 and the hub is retained by a jam nut 75 that is threaded onto the shaft terminal.

In order to provide a direct driving connection between the rotor and fan hub the web of the rotor has an annular setting face 76 shaped to correspond with the inner face of the hub. Projecting from the seating face is one or more driving pins 77 which extend through openings 78 in the hub of the fan. If desired, the pins may be formed of a material and size to constitute shear pins which are adapted to shear off in case the blades should strike on any object that may be accidentally brought in contact therewith.

The fan blades 79 are mounted on the annular wall of the hub and extend radially therefrom for rotation within the ring 3 as shown in Fig. 1. It is to be noted that the main anti-friction bearing 36 is mounted in the center of gravity of the rotary element of the motor and fan and that the smaller bearing merely stabilizes the shaft.

In assembling the fan, the stator is mounted on the tubular support 30 and the shaft 37 carrying the rotor is mounted therein and supported by the main bearing. The cap 40 is inserted to close the open end of the tubular support, after which the bearing 39 is inserted in the cap and the washer 42 and cap screw are applied to take up longitudinal play of the shaft 37 relative to the tubular support 30. The motor unit is then applied to the studs 27 and the nuts 34 adjusted to register the axis of the motor coaxially with the axis of the stator housing 12. The fan hub carrying the fan blades is applied by passing the hub over the motor so that terminal 73 of the shaft 37 passes through the opening 69 and the pins 77 on the rotor pass into the openings 78 of the fan hub. In this position the flange or lip 64 of the housing engages the periphery of the sealing ring 21. The nut 75 is then applied to retain the fan assembly on the shaft 37 and the hub in driven connection with the rotor.

In installing the unit, it may be inserted within a duct by applying the ring 5 in registry with the ring 4 and securing the abutting flanges 7 and 8 by the fastening devices 10. The flanges 6 and 9 may then be connected with adjacent sections of the duct. If the unit is to be applied over a vent opening, it may be suitably supported by connecting one or the other of the flanges 6 or 9 in encircling relation with the opening. The leads of the motor that are extended through one of the vanes 11 are connected with the source of current supply.

Upon closure of the motor circuit the rotor 45 rotates about the stator with the shaft 37 turning freely within the main bearing 36 which carries substantially the entire load while the smaller bearing steadies the shaft to maintain the rotor in concentric position. With the use of sealed bearings no other lubrication is required. Since the rotor is directly connected to the fan hub by means of the pins 77, the shaft 37 is merely an idling shaft which turns within the tubular support. During operation of the rotor the seal 21 closes the gap between the hub and housing 12 and prevents circulation of contaminated air or moisture through the motor, however, the air trapped within the motor enclosure is continuously circulated through the tubes 58 and discharged through the openings 49 and into contact with the inner surface of the fan hub and housing so that the heat of operation is transmitted through and dissipated into the air or gas stream being handled by the fan. If desired external ventilation may be provided by circulating air from a remote source through one of the stationary guide vanes 11 and discharging it through a suitable orifice between the fan hub and housing.

Figure 7:
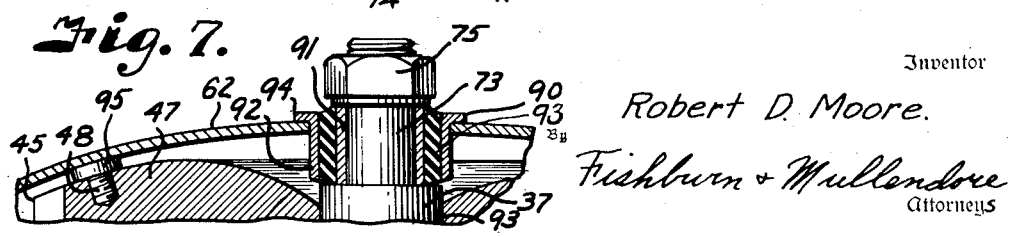
Fig. 7 is a fragmentary sectional view of a modified form of mounting the fan on the rotor.
Figure 4:
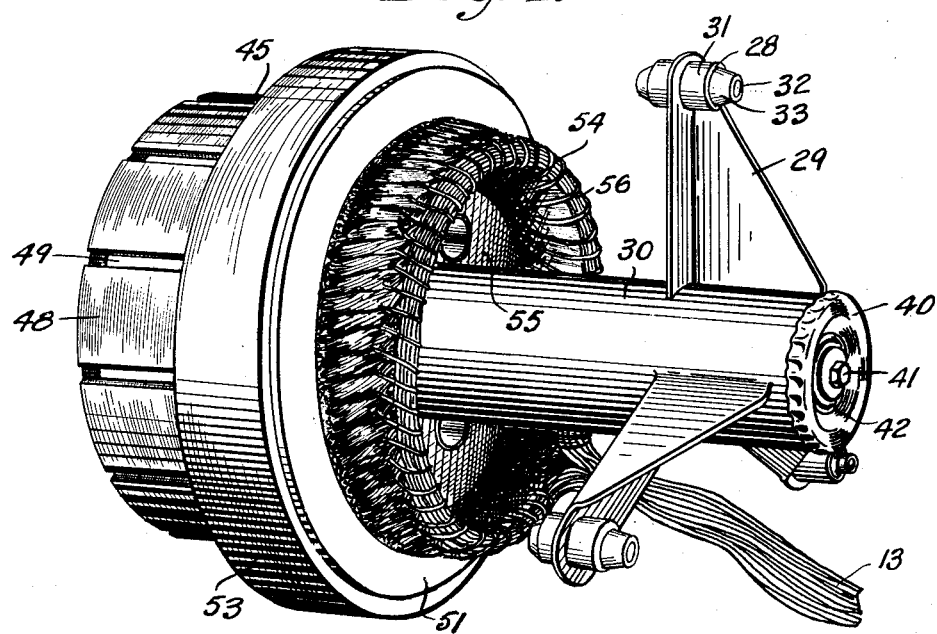
Fig. 4 is a perspective view of the motor.
Figure 5:
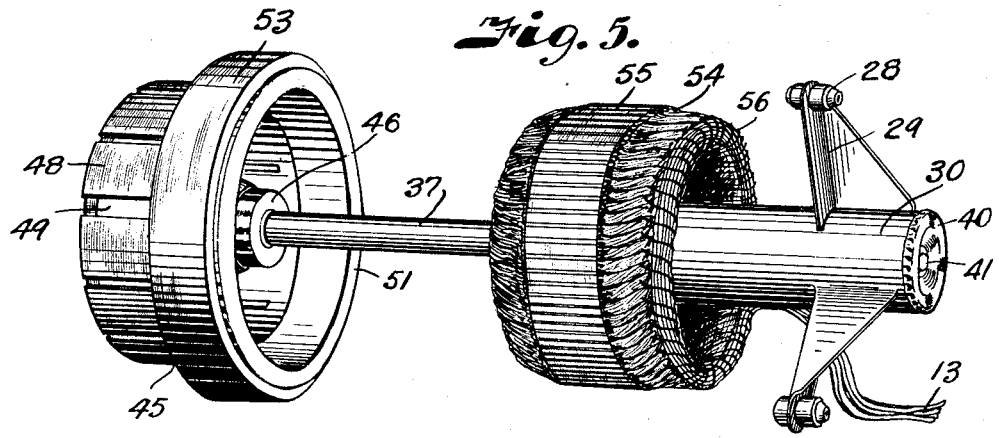
Fig. 5 is a similar view showing the stator and rotary elements of the motor in spaced relative relations.
Figure 6:
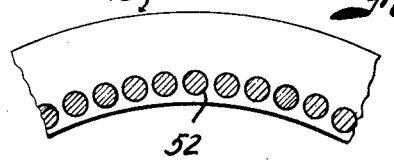
Fig. 6 is a fragmentary section through the rim of the motor rotor.

Figure 7 illustrates a resilient mounting of the fan hub. In this form of mounting the reduced terminal 73 of the shaft 37 carries a resilient mount 90 which includes an inner sleeve 91 sleeved on the terminal 73 and outer sleeve 92 and an intermediate resilient bushing 93, the bushing 93 being secured to the sleeves 91 and 92. The outer sleeve 92 has a flange 94 that presses against the outer face of the hub wall 62. The driving connection between the rotor 45 and the hub is effected by rubber buttons 95 that are attached to the web 47 of the rotor by studs 48. Upon application of the nut 75 to the threaded end of the terminal 73 the hub is retained in frictional engagement with the buttons 95 to provide the desired driving connection between the rotor and the fan hub. It is thus obvious that the fan is resiliently mounted on the rotor so as to avoid transmission of vibrations to the motor.

Figure 8:
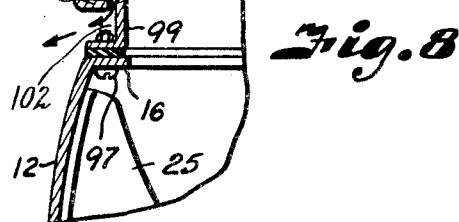
Fig. 8 is a fragmentary sectional view of a modified form of connection between the stator housing and the fan hub.

Figure 8 illustrates a modified form of connection between the housing 12 and hub 61 of the fan. In this form of the invention a guard 99 is fixed to the flange 16 by fastening devices 97. The guard 99 has a circumferential flange 100 that bridges the gap 101 between the stator housing 12 and the hub of the fan and which extends into the hub and substantially overlaps the periphery of the rotor. The flange 100 is spaced inwardly from the flange 64 of the fan hub to provide an annular outlet 102 for air used in cooling the motor, the air being admitted through any one of the vanes 11 as previously suggested.

From the foregoing it will be obvious that the motor is substantially rugged and of simple construction, there being only one moving part and this part is adequately supported on a main bearing that permits free rotation on the axis of the stator.

It is obvious that the structure is well adapted for economical manufacture from the more expensive, non-corrosive metals to eliminate corrosive effects on the fan unit.

The construction also permits the manufacture of standard parts which may be assembled to provide fans having mechanical efficiency required for a particular purpose. For example, the units will be constructed of the same parts and a unit of desired capacity is readily produced by varying the number and position of the blades on the hub of the fan, the number and angle setting of the fan blades and guide vanes to produce the required capacity flow for a particular installation in the manner disclosed in my copending application for patent filed December 29, 1945, Serial No. 638,190.

What I claim and desire to secure by Letters Patent is:

1. A fan including a stationary housing having an open side, a tubular mounting member, means supporting one end of the tubular mounting member in the stationary housing for projection of the other end through said open side, a motor stator mounted on the projecting end of the shaft, air ducts extending through said stator in spaced relation about said tubular mounting member, a shaft journalled in the tubular mounting member and having an end projecting therefrom, a rotor mounted on said shaft and having a circumferential series of arms extending parallel with said shaft and spaced radially therefrom, said arms being spaced apart to provide air passageways therebetween, a plurality of ring-shaped laminations mounted on said arms for forming an armature cooperating with said stator, a hub-like housing enclosing the rotor and having an opening registering with the opening of the stationary housing and spaced from said laminations to provide space in connection with space within the stationary housing and cooperating with the air ducts and said air passageways between the arms for circulation of air around said stator and armature to and from the supporting housing, and means connecting the hub-like housing with the rotor to rotate therewith.

2. A fan including a stationary housing having an open side, a tubular mounting member, means supporting one end of the tubular mounting member in the stationary housing for projection of the other end through said open side, a motor stator mounted on the projecting end of the shaft, air ducts extending through said stator in spaced relation about said tubular mounting member, a shaft journalled in the tubular mounting member and having an end projecting therefrom, a rotor mounted on said shaft and having a circumferential series of arms extending parallel with said shaft and spaced radially therefrom, said arms being spaced apart to provide air passageways therebetween, a plurality of ring-shaped laminations mounted on said arms for forming an armature cooperating with said stator, a hub-like housing enclosing the rotor and having an opening registering with the opening of the stationary housing and spaced from said laminations to provide space in connection with space within the stationary housing and cooperating with the air ducts and said air passageways between the arms for the circulation of air around said stator and armature to and from the supporting housing, means connecting the hub-like housing with the rotor to rotate therewith, and a sealing ring carried by one of the housings in encircling relation with the opening therein and having contact with the other of said housings to close space between said housings.

3. A fan including a stationary housing having an open side, brackets spaced circumferentially about the inner side of the housing, a tubular mounting member having radially disposed arms, resilient means connecting the arms with said brackets for supporting the opposite end of the tubular mounting member in projection through said open side, a motor stator mounted on the projecting end of the shaft, air ducts extending through said stator parallel with and in radially spaced relation with said tubular mounting member, a shaft journalled in the tubular mounting member and having an end projecting therefrom, a rotor mounted on said shaft and having a series of arms spaced apart circumferentially to provide air passageways therebetween, a plurality of ring-shaped laminations mounted on said arms for forming an armature cooperating with said stator to effect rotation of the rotor, a hub-like housing covering the rotor and having an opening registering with the opening of the supporting housing and spaced from said laminations to cooperate with the air ducts and said air passageways between the arms for the circulation of air around said stator and the armature to and from the supporting housing, and means connecting the hub-like housing with the rotor to rotate therewith.

4. A fan including a stationary housing having an open side, brackets spaced circumferentially about the inner side of the housing, a tubular mounting member having radially disposed arms, resilient means connecting the arms with said brackets for supporting the opposite end of the tubular mounting member in projection through said open side, a motor stator mounted on the projecting end of the shaft, air ducts extending through said stator in spaced substantially parallel relation with said tubular mounting member, a shaft journalled in the tubular mounting member and having an end projecting therefrom, a rotor including a hub portion mounted on said shaft and having arms extending laterally from said hub portion and spaced apart circumferentially to provide air passageways therebetween, a plurality of ring-shaped laminations mounted on said arms in spaced relation with the hub portion for forming an armature cooperating with said stator to effect rotation of the rotor, a hub-like housing covering the rotor and having an opening registering with the opening of the supporting housing and spaced from said laminations to cooperate with the air ducts and said spaces between the arms for the circulation of air around said stator and the armature to and from the supporting housing, and means connecting the hub-like housing with the rotor to rotate therewith, said housings being spaced to allow relative movement incidental to said resilient mounting of said arms.

5. A fan including a stationary support housing having an open side, brackets spaced circumferentially about the inner side of the housing, a tubular mounting member having radially disposed arms, resilient means connecting the arms with said brackets for supporting the opposite end of the tubular mounting member in projection through said open side, a stator mounted on the projecting end of the shaft, a shaft journalled in the tubular mounting member and having an end projecting therefrom, a rotor mounted on said shaft and carrying a plurality of ring-shaped laminations for forming an armature to cooperate with the stator in effecting rotation of the rotor, a hub-like housing on said shaft having an opening registering with the opening of the stationary housing, said housings being spaced apart to accommodate relative movement incidental to said resilient means, and a sealing ring carried by one of the housings in encircling relation with the opening therein and having contact with the other housing to connect said openings and close the space between said housings.

ROBERT D. MOORE.

REFERENCES CITED

The following references are of record in the file of this patent:

UNITED STATES PATENTS

| Number | Name | Date |
|---|---|---|
| 931,620 | Kelley | Aug. 17, 1909 |
| 1,820,985 | McKee | Sept. 1, 1931 |
| 1,860,885 | Bilde | May 31, 1932 |
| 1,920,309 | Hoseason | July 1, 1933 |
| 2,001,151 | Newnham | May 14, 1935 |
| 2,021,510 | Jones | Nov. 19, 1935 |
| 2,030,367 | Grave | Feb. 11, 1936 |
| 2,031,688 | Bowen | Feb. 25, 1936 |
| 2,053,425 | Else | Sept. 8, 1936 |
| 2,207,251 | Guedon | July 9, 1940 |
| 2,247,648 | Blessing | July 1, 1941 |
| 2,307,827 | Dooughman | Jan. 12, 1943 |
| 2,386,508 | Ripley | Oct. 9, 1945 |
| 2,397,171 | Troller et al. | Mar. 26, 1946 |
| 2,427,947 | Koch | Sept. 23, 1947 |
| 2,430,225 | Hagler | Nov. 4, 1947 |

FOREIGN PATENTS

| Number | Country | Date |
|---|---|---|
| 869,258 | France | Oct. 29, 1941 |
| 171,673 | Switzerland | Dec. 1, 1934 |